United States Patent

Fader et al.

[15] 3,687,480

[45] Aug. 29, 1972

[54] VEHICLE LEVELING SYSTEM

[72] Inventors: John H. Fader; Johan H. Keijzer, both of Hasselt; Marcel J. R. Graulus, St. Truiden, all of Belgium

[73] Assignee: Monroe Belgium N.V., St. Truiden, Belgium

[22] Filed: June 12, 1970

[21] Appl. No.: 45,866

[52] U.S. Cl ............................. 280/124 F, 267/65 D
[51] Int. Cl ............................................. B60g 17/00
[58] Field of Search ................. 280/124 F; 267/65 D

[56] References Cited

UNITED STATES PATENTS

| | | | |
|---|---|---|---|
| 3,232,306 | 2/1966 | Miller | 280/124 F |
| 3,448,779 | 6/1969 | Horwitt | 152/415 X |
| 3,057,423 | 10/1962 | Walker | 180/1 R |

*Primary Examiner*—Philip Goodman
*Attorney*—Harness, Dickey & Pierce

[57] ABSTRACT

A vehicle leveling system comprising a pair of fluid actuated leveling devices which are adapted to have a supply of pressurized actuating fluid communicated thereto in order to control the relative attitude between the sprung and unsprung portions of a vehicle; the system including a fluid supply assembly which is preferably disposed in the trunk compartment of the associated vehicle and comprises a minimum pressurized valve which assures that a predetermined minimum pressure is maintained in the system, and means for removably receiving portable disposable containers of actuating fluid and means for removing the fluid from the containers and communicating the same to the leveling system in order to effect actuation thereof.

30 Claims, 3 Drawing Figures

PATENTED AUG 29 1972

3,687,480

INVENTORS.
John H. Fader,
Johan H. Heitzer,
BY Marcel V. R. Graulus
Harness, Dickey & Pierce
ATTORNEYS

VEHICLE LEVELING SYSTEM

BACKGROUND OF THE INVENTION

The present invention generally concerns itself with vehicle leveling systems of the type comprising a pair of fluid, and in particular gas, actuated leveling devices which function to elevate the rearward end of the vehicle chassis with respect to the rear axle assembly upon supplying the devices with a suitable source of pressurized gas, such as compressed air, $CO_2$ or the like. More particularly, the present invention is directed toward a leveling system which is not only designed to utilize a supply of pressurized gas, such as is available at automobile service stations and the like, but is also adapted to use as a source of actuating fluid or pressurized gas, individual portable disposable containers which have been charged with a suitable pressurized actuating gas. Thus, at such time as the vehicle operator is desirous of raising the rearward end of his vehicle chassis to some predetermined level attitude, as might occur when the vehicle is heavily loaded, the vehicle may be driven to a service station where the leveling device may be supplied with a pressurized gas such as is commonly available at such stations; however, in the event such a service station is not available to the operator, he may use one or more portable containers of pressurized gas, which he could conveniently carry in the trunk compartment, glove compartment or the like of the car, for effecting actuation of the devices.

The present invention further encompasses the use of a minimum pressure valve arrangement which is adapted to basically function in maintaining a preselected minimum pressure in the associated leveling system which is necessary when certain types of leveling devices are incorporated therein. The reason for this is that in certain types of leveling devices, such as the type which combine a gas expansion chamber with a vehicle shock absorber, a resilient flexible diaphragm member is utilized in providing the gas chamber, and it has been found that if the pressure within the gas chamber drops below some predetermined minimum pressure level, the diaphragm may possibly be damaged during operation of the associated shock absorber. Accordingly, in order to prevent such damage, the minimum pressure valve of the present invention is provided to assure that the necessary minimum pressure is maintained in the leveling system.

SUMMARY OF THE INVENTION

This invention relates generally to vehicle leveling systems and, more particularly, to a leveling system which is adapted to use as a source of actuating fluid, one or more portable disposable containers of such fluid, which containers may be conveniently carried within the vehicle and utilized when leveling of the vehicle is desired. Additionally, the present invention is directed for a new and improved minimum pressure valve which may be operatively associated with the inlet means which supplies actuating fluid to the system in order to assure that a preselected minimum pressure is maintained in the system.

It is accordingly a general object of the present invention to provide a new and improved vehicle leveling system.

It is a more particular object of the present invention to provide a new and improved vehicle leveling system which is adapted to utilize portable disposable containers or cartridges of actuating fluid as a source of such fluid for the system.

It is another object of the present invention to provide a new and improved leveling system of the above character which features a minimum pressure valve for maintaining a preselected minimum pressure in the system.

It is another object of the present invention to provide a leveling system of the above described type which includes a novel unitized assembly embodying both the minimum pressure valve and the means for removably receiving containers or cartridges of actuating fluid.

It is a related object of the present invention to provide a single unitized assembly of the above described type which is further provided with an inlet and discharge valve which may be utilized in connection with a conventional supply line valve or "chuck" as is commonly available at vehicle service stations and the like.

Other objects and advantages of the present invention will become apparent from the following detailed description taken in conjunction with the accompanying drawing.

DETAILED DESCRIPTION OF THE PREFERRED EMBODIMENT

Figures 1, 2, 3:
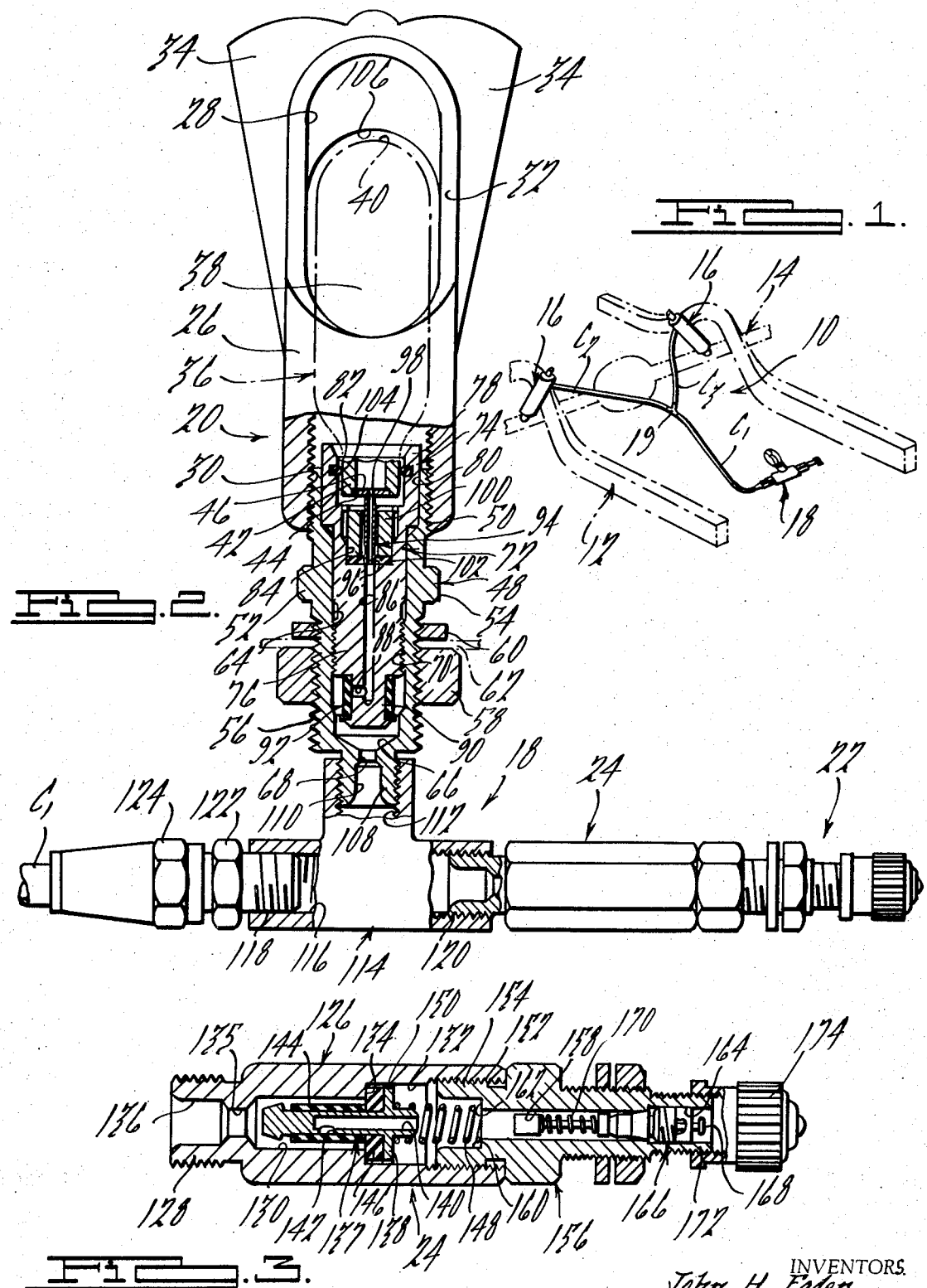
FIG. 1 is an elevated perspective view of the vehicle leveling system of the present invention, as shown in operative association with a portion of a conventional automotive vehicle.
FIG. 2 is an enlarged top elevational view, partially broken away, of the combination minimum pressure valve and cartridge receiver of the present invention.
FIG. 3 is a longitudinal cross-sectional view of the minimum pressure valve and combination inlet and discharge valve incorporated in the assembly shown in FIG. 2.

Referring now in detail to the drawing and in particular to FIG. 1, a vehicle leveling system, generally designated 10, is shown in operative association with a fragmentary portion of the rear end of an automotive frame 12 which is operatively associated with a rear axle assembly 14. The frame 12 and hence the chassis of the associated vehicle is adapted to be operatively supported, at least in part, upon the axle assembly 14 by means of a pair of vehicle leveling devices, generally designated 16, which are adapted to function in varying the relative attitude between the vehicle chassis or frame 12 and axle assembly 14 under various loading conditions, whereby the vehicle chassis may be maintained in a relatively level or horizontal attitude. Generally speaking, the leveling devices 16 may be of any suitable fluid or gas actuated construction and preferably the devices 16 are operatively associated with conventional hydraulic shock absorbers of the type well known in the art. By virtue of the fact that various types of gas operated leveling devices may be incorporated or operatively associated with the leveling system 10 of the present invention, a detailed description of such devices will be omitted for purposes of simplifying the instant disclosure, it being appreciated that said devices 16 are adapted to expand longitudinally upon an increase in fluid or gas pressure therewithin so as to elevate the rearward end of the frame 12 with respect to the axle assembly 14. Similarly, upon a decrease in pressure of the actuating fluid or gas within the devices 16, said devices are adapted to contract longitudinally in order to lower the rearward end of the frame 12 with respect to the axle assembly 14. As will hereinafter be described in detail, the fluid or gas pressure supplied to the leveling devices 16 is controlled by means of a pressure control assembly, generally designated by the numeral 18, which is preferably, although not necessarily, located within the trunk compartment of the associated vehicle and is communicable via a suitable fluid conduit $C_1$, Y-fitting 19, and conduits $C_2$ and $C_3$, with the leveling devices 16.

Generally speaking, the pressure control assembly 18 comprises three separate, but cooperable, sections or subassemblies which are adapted to perform the following functions. First of all, the pressure control assembly 18 comprises a fluid or gas cartridge receiving section, generally designated 20, which is adapted to removably receive a portable disposable container or cartridge of pressurized fluid or gas, the contents of which are designed to be communicated via the conduits $C_1$, $C_2$ and $C_3$ to the leveling devices 16 in order to effect selective actuation thereof. Secondly, the pressure control assembly 18 comprises an inlet and discharge valve section 22 through which pressurized fluid or gas is designed to be admitted or released from the leveling system 10. Finally, the assembly 18 comprises a minimum pressure valve 24 which is adapted to function in maintaining a preselected minimum gas pressure within the system 10, regardless of whether or not the valve section 22 is open to the atmosphere, whereby to assure that a minimum pressure is maintained in the leveling devices 16 so as to prevent inadvertent damage thereto, as will hereinafter be explained in detail.

Referring now in detail to the construction of the cartridge receiving section 20 of the assembly 18, as best illustrated in FIG. 2, the section 20 comprises an elongated, generally cylindrically shaped enclosure 26 which defines an elongated hollow bore or cavity 28 that is internally threaded at the open end thereof, as seen at 30, and is provided with an access opening 32 in the side thereof adjacent the end opposite the threaded portion 30. The enclosure 26 is provided with one or more outwardly projecting, radially outwardly diverging flange portions 34 which are formed integrally of the enclosure 26 and are adapted to facilitate manual grasping thereof in order to effect rotation of the enclosure about the longitudinal axis thereof. The cavity 28 is adapted to removably receive containers or cartridges of pressurized actuating fluid or gas of the type well known in the art and one of which is shown in FIG. 1 and designated by the numeral 36. The cartridge 36 comprises a generally elongated cylindrical body section 38, one end of which terminates in a generally hemispherical end portion 40 and the opposite end of which is formed with a generally necked-down or reduced diameter discharge portion 42. The interior of the cartridge 36 is adapted to be charged or be loaded with pressurized or compressed actuating fluid or gas, commonly carbon dioxide ($CO_2$), which is adapted to be discharged from the interior of the cartridge 36 through a reduced diameter discharge opening 44. The opening 44 is provided with a closure plug 46 which is designed to be biased or perforated in the manner hereinafter to be described whereby to permit the compressed material within the cartridge 36 to be discharged therefrom. The size of the access opening 32, as well as the axial length and diameter of the cavity 28 is designed such that the cartridge 36 may be easily inserted into the cavity 28 and be removed therefrom for disposal at such time as the contents of the cartridge has been discharged. Cartridges such as that shown herein are manufactured and marketed in standard sizes, volumes and are charged at various preselected pressures. Additionally, such cartridges are fabricated of a relatively inexpensive material and are thus designed to be disposed of after the contents thereof has been discharged and used in actuation of the leveling devices 16, as will hereinafter be described.

The cartridge receiving enclosure 26 is adapted to be operatively associated with an elongated, generally cylindrically shaped housing member 48, the upper end of which is formed with an externally threaded portion 50 adapted to be threadably engaged with the threaded portion 30 of the enclosure 26. The housing member 48 also comprises an enlarged diameter intermediate section 52, the outer periphery of which is formed with a plurality of wrench engaging flats or facets 54, with the member 48 being formed with a second externally threaded portion 56 on the side of the section 52 opposite the portion 50. The threaded portion 56 is adapted to have one or more retaining nuts or the like, generally designated 58 and 60, threadably received thereon for clamping engagement with a suitable structural member, representatively designated by the numeral 62, which functions to operatively support the assembly 18 within the trunk compartment of the associated vehicle. It will be appreciated, of course, that various alternative means, such as well known types of mounting brackets or the like, may be used for operatively supporting the assembly 18 without departing from the scope of the present invention.

The interior of the housing member 48 is formed with an elongated cylindrical bore 64, one end of which is exposed to the interior of the cavity 28, and the opposite end of which terminates in an end wall portion 66 which is formed with a reduced diameter flow passage 68. The bore 64 is internally threaded at an intermediate portion 70 thereof and is adapted to operatively support a cartridge piercing assembly, generally designated by the numeral 72.

The assembly 72 comprises an elongated cylindrical support element, generally designated 74 which comprises an externally threaded body section 76 adapted to be threadably engaged with the threaded portion 70 of the housing 48 and is thereby coaxially located within the bore 64. The element 74 comprises an enlarged diameter head section 78 which is nestingly received within a counterbore 80 formed in the end of the housing member 48 adjacent the enclosure member 26, the head section 78 in turn defining a central annular recessed area 82 which is adapted to nestingly receive the reduced diameter portion 42 of the cartridge 36 that is inserted into the enclosure 26. The recessed area 82 is communicable with a reduced diameter annulus 84 which is in turn communicable with a longitudinally extending fluid passage or bore 86 formed in the element 74. The end of the passage 86 opposite the annulus 84 is communicable via a radially outwardly extending passage 88 with the portion of the bore 64 that is axially aligned with a radially inwardly disposed recessed or necked-down portion 90 formed at the end of the element 74 adjacent the end wall portion 66. An annular sleeve valve member 92, which is fabricated of a resilient deformable (expandable) material, such as rubber or the like, is mounted circumjacent the portion 90 and is adapted to act as a check valve to selectively close the passage 88 and thereby prevent pressurized fluid from flowing from the interior of the bore 64 back through the passages 88 and 86. The valve 92 is designed such that it will be sufficiently expandable so as to expand radially outwardly when the pressure within the passages 86, 88 exceeds a predetermined level so as to permit the fluid introduced into the passages 86, 88 to be communicated therefrom into the bore 64, from where such fluid is communicated through the passage 68, in a manner later to be described.

Disposed within the annulus 84 is a centrally located axially extending piercing member 94 which is formed with an internal bore or passage 96 that is communicable with the passage 86 and the outer end of which is formed with an inclined piercing portion 98. The piercing member 94 is adapted to be operatively supported within the annulus 84 by means of a generally cylindrically shaped support member 100 that is threadably received within the annulus 84 and is provided with a suitable sealing member 102 which assures leakage-free communication of gas from the passage 96 to the passage 86. Fluid leakage is also prevented by means of an annular O-ring sealing member 104 which is disposed around the inner periphery of the recessed area 82, which sealing member 104 is adapted to sealingly engage the outer periphery of the necked-down discharge portion 42 of the cartridge 36 received within the enclosure 26.

Briefly, in operation of the assembly 18, a suitable cartridge 36 filled with pressurized gas is inserted through the access opening 32 into the cavity 28 to a position wherein the closure plug 46 thereof bears against the pointed end portion 98 of the piercing member 94. The enclosure 26 is then manually grasped and rotated by means of the outwardly diverging flange portions 34, whereby a generally hemispherical end wall 106 in the cavity 28 engages the end wall portion 40 of the cartridge 36 to force the cartridge downwardly in FIG. 2 or toward the piercing assembly 72. As the cartridge 36 is thus forced toward the assembly 72, the piercing member 94 will pierce or puncture the closure plug 46, whereby the pressurized contents of the cartridge 36 will be discharged through the passages 96, 86 and 88, past the valve member 92 and through the end of the bore 64 to the flow passage 68. The pressurized contents of the cartridge will thereafter be communicable through the conduits $C_1$, $C_2$ and $C_3$ to the leveling device 16 to effect expansion thereof and hence elevation of the rearward end of the associated automotive vehicle. At such time as the contents of the cartridge 36 have been dispensed, the enclosure 26 may be rotated in the opposite direction relative to the housing member 48 and the cartridge 36 may be thereafter removed and discarded.

The end of the housing member 48 opposite the enclosure 26 is provided with a reduced diameter externally threaded section 108 which is formed with an internal annular recess 110 communicable with the passage 68. The section 108 is adapted to be threadably received within an internally threaded bore 112 provided in a generally T-shaped fluid fitting 114 which defines a cross bore 116 that intersects the bore 112 and is internally threaded at the opposite ends thereof, as seen at 118 and 120. The bore 116 is communicable via suitable fluid fittings 122 and 124 with the fluid conduit $C_1$ and hence with the leveling devices 16 via the conduits $C_2$ and $C_3$, with the fitting 122 being threadably received within the bore 116, of the end portion 118, as illustrated. The end of the bore 116 opposite the fitting 122 is communicable with an elongated cylindrical valve housing 126 which contains the minimum pressure valve section 24 of the present invention and is formed with a reduced diameter externally threaded portion 128 that is threadably connected to the fitting 114, as shown. The housing member 126 is formed with a pair of coaxial communicable bore sections 130 and 132 that define a generally radially extending shoulder 134 therebetween. The bore section 130 is communicable via a reduced diameter passage 135 with an enlarged annulus 136 defined by the housing 126 and communicable with the interior of the bore 116 and hence with the conduit $C_1$. Disposed within the bore sections 130, 132 is an elongated cylindrical valve pin 137 which is formed with a radially outwardly extending shoulder portion 138 and with an internally, centrally disposed blind fluid passage 140. The passage 140 is communicable at the upper end thereof with the interior of the bore section 132 and at the opposite end thereof with a transverse passage 142 which is normally closed by a hollow cylindrical sleeve valve member 144. The member 144 is fabricated of a resilient expandable material, such as molded rubber, and is adapted to normally block fluid flow from the interior of the bore section 130 to the fluid passage 140, yet expand radially outwardly to provide fluid flow from the passage 142 into the bore section 130 when the pressure within the passage 140 exceeds some predetermined amount. Hence, valve member 144 acts as a one-way check valve to selectively control fluid flow through the passage 142.

The radial shoulder portion 138 of the valve pin 137 carries an annular valve member 146 which is adapted to sealingly engage the radial shoulder 134 to block fluid flow from the bore section 132 to the section 130, with the valve member 146 being resiliently urged into engagement with the shoulder 134 by means of a helical coil spring 148, one end of which extends circumjacent the end of the valve pin 137 and abuts against the shoulder portion 138 thereof. It may be noted that the outer periphery of the shoulder portion 138 is formed with a plurality of circumferentially spaced serrations or recesses 150 which provide for fluid flow around the periphery of the shoulder portion 138 from the bore section 132 to the section 130 at such time as the valve pin 137 and hence the valve member 146 carried thereby is displaced toward the right in FIG. 3 against the resistance of the spring 148 to a position wherein the valve member 146 is disengaged from the shoulder 134.

In operation, the valve pin 137 and valve member 146 are adapted to function as a minimum pressure valve in maintaining a preselected minimum pressure within the leveling devices 16. More particularly, it will be seen that the spring 148 will maintain the valve member 146 engaged with the shoulder 134 until such time as the pressure within the bore section 130 exceeds some predetermined pressure level within the bore section 132 and the effective force of the spring 148 acting against the valve pin 137. When such a predetermined pressure exists, the valve pin 137 will be biased toward the right in FIG. 3, thereby communicating the bore sections 130 and 132 to permit fluid pressure to be communicated from the section 130 to the section 132. At such time as a preselected pressure drop has occurred within the bore section 130, and hence within the leveling devices 16, the valve spring 148 will bias the valve pin 137 toward the left in FIG. 3 to sealingly engage the valve member 146 with the shoulder portion 134, thereby preventing any further reduction in the fluid pressure within the system 10. The size of the spring 148, as well as the area of the valve member 146 and valve pin 137 are selected such that the minimum pressure that is maintained within the leveling devices 16 is sufficient to assure against any damage to the diaphragm members or the like conventionally provided thereon.

The end of the bore section 132 opposite the bore section 130 is formed with an internally threaded area 152 which is adapted to threadably engage an externally threaded mounting section 154 of an inlet and discharge valve housing, generally designated 156, which is thereby fixedly secured to the housing 126 and is arranged generally coaxially thereof. The housing 156 is formed with an elongated cylindrical central bore 158 that terminates within the mounting section 154 in an enlarged diameter counterbore 160 that defines a radial face 162 against which one end of the spring 148 bears. The end of the bore 158 opposite the counterbore 160 is formed with another counterbore 164 that cooperates with the bore 158 in operatively supporting a valve core assembly, generally designated by the numeral 166. The assembly 166 is of a construction well known in the art and is commonly employed in inflatable or balloon tires as are conventionally used on bicycles, automobile vehicles, trucks and the like. By virtue of the fact that the construction and operation of the valve core assembly 166 is well known in the art, a detailed description thereof will be omitted in order to simplify the present application, it being appreciated that the assembly 166 is provided with a valve plunger 168 which is adapted to be depressed against the resistance of a valve spring 170 when a suitable air chuck is surmounted on the outer end 172 of the housing 156 in order to introduce pressurized gas into the bore 158. As illustrated, a suitable closure member or cap 174 may be threadably received upon the end portion 172 of the housing 156 to prevent dirt and the like from accumulating within the counterbore 164 and possibly interfering with normal operation of the valve assembly 166.

In operation of the inlet and discharge valve section 22 of the assembly 18, at such time as it is desired to introduce pressurized gas into the assembly 18, a conventional chuck fitting, as is commonly provided on gas pressure lines, is surmounted over the end portion 172 of the housing 156, resulting in the compression of the plunger 168 to permit the pressurized gas to flow into the bore 158 and then into the counterbore 160 to the bore section 132. The pressurized gas is then communicated through the passages 140, 142, past the valve member 144 into the bore 116 and conduits $C_1$, $C_2$ and $C_3$ to the leveling devices 16 to effect expansion thereof and elevation of the rearward end of the chassis of the associated vehicle. When it is desired to contract the leveling devices 16, and thus lower the rear end of the vehicle chassis, the plunger 168 is merely depressed, which results in venting the bore section 132 with the atmosphere, whereby the pressure within the system 10 will force the valve pin 137 and valve member 146 toward the right in FIG. 3 against the resistance of the spring 148 to relieve the pressure in the system 10. By virtue of the minimum pressure valve 24 of the assembly 18, at such time as the pressure within the system 10 reaches a predetermined minimum level, the valve spring 148 will bias the valve pin 137 and valve member 146 toward the left in FIG. 3 to block further pressure loss and thereby maintain the desired minimum pressure within the system, as above described.

It may be noted that while the various sections 20, 22 and 24 of the assembly 18 are shown in a single unitized assembly, the various sections of the assembly 18 may be located separately commensurate with each particular vehicle installation. For example, the minimum pressure valve 24 could be mounted directly upon one of the associated leveling devices 16, leaving either of the cartridge receiving section 20 and/or inlet and discharge valve section 22 for mounting within the trunk compartment of the associated vehicle. Similarly, it will also be appreciated that the assembly 18 could be located within the passenger or engine compartments of the vehicle instead of within the trunk compartment thereof, or alternatively, could be located in some conveniently accessible portion of the vehicle exteriorly of any of these compartments, without departing from the scope of the present invention. Additionally, while reference has been made herein to actuation of the leveling devices 16 by means of either a pressurized fluid or gas, the leveling system 10 is particularly adapted for use with a pressurized gas such as compressed air or $CO_2$ which could be supplied to the system via the inlet and discharge section 22. In this respect, the cartridge receiving section 20 is particularly adapted to receive cartridges of $CO_2$ which are readily available to all consumers; however, it is to be noted that cartridges filled with various alternative gases, such as compressed air, nitrogen and the like could be used without departing from the scope of the present invention.

While it will be apparent that the preferred embodiment illustrated herein is well calculated to fulfill the objects above stated, it will be appreciated that the present invention is susceptible to modification, variation and change without departing from the scope of the invention.

We claim:

1. In combination with a fluid actuated leveling strut interposed between and adapted to control the attitude between sprung and unsprung portions of a vehicle,
   a pressure control valve for maintaining a preselected fluid pressure within a variable volume chamber in said strut,
   said valve including housing means defining a fluid passage communicable with said chamber in said strut
   a valve member within said housing movable between positions opening and closing a flow path communicable with said fluid passage, said valve member normally closing said flow path and being movable to a position opening said path in response to a pre-selected fluid pressure within said chamber, and
   means for controlling the pressure at which said valve member moves toward said position opening said flow path.

2. The combination as set forth in claim 1 wherein said leveling strut comprises first and second relatively movable parts which are expandable and contractable in response to increases and decreases in fluid pressure in said chamber.

3. The combination as set forth in claim 1 which includes fluid inlet and discharge valve means for admitting and relieving fluid pressure supplied to said housing.

4. The combination as set forth in claim 1 wherein said leveling strut is gas operated and wherein said pressure control valve maintains a preselected minimum gas pressure within said chamber.

5. The combination as set forth in claim 1 which includes a pair of fluid actuated devices, conduit means communicating fluid pressure from said devices to said pressure control valve, and means for communicating said control valve with different sources of fluid pressure.

6. The combination as set forth in claim 1 wherein said pressure control valve comprises first and second valve means said first valve means providing a fluid flow to said strut and second valve assembly including said valve member and operable to relieve fluid pressure in said chamber.

7. The combination as set forth in claim 6 wherein said first valve means comprises a check valve, and which includes spring means operable to bias said valve member toward a position closing said flow path.

8. In combination with an automotive vehicle including passenger, luggage, and engine compartments, a sprung portion, an unsprung portion, and at least one fluid actuatable elevating device for controlling the relative attitude between the vehicle portions,
   a fluid system for communicating actuating fluid between one of the vehicle compartments and the elevating device, and
   fluid pressure control means within one of said vehicle compartments, said pressure control means normally maintaining an open fluid flow path between a fluid source and said system and being automatically actuatable to close said path when a predetermined minimum fluid pressure exists in said system.

9. The combination as set forth in claim 8 wherein said system includes means for removably receiving portable disposable containers of actuating fluid and means for communicating fluid within said containers to said elevating device.

10. The combination as set forth in claim 9 wherein said elevating device is gas operated and said last mentioned means is adapted to removably receive disposable containers of a pressurized gas.

11. The combination as set forth in claim 10 which includes means for operably mounting said container receiving means within the trunk compartment of a vehicle.

12. In combination with a fluid actuated device for controlling the attitude between the sprung and unsprung portions of a vehicle,
    an enclosure for removably receiving portable disposable containers of actuating fluid, and
    means for selectively communicating fluid from a container disposed within said enclosure and fluid passage means for communicating actuating fluid from said enclosure to a variable volume chamber in said device for increasing the volume of said chamber and thereby changing the attitude between the vehicle portions.

13. The combination as set forth in claim 12 wherein said device is gas operated and wherein said enclosure is adapted to communicate pressurized gas within containers to said passage means.

14. The combination as set forth in claim 13 which includes a portable disposable cartridge of carbon dioxide adapted for removable reception within said enclosure.

15. The combination as set forth in claim 13 which includes means engageable with the discharge opening of said containers for receiving pressurized gas therefrom and communicating the same to said fluid passage.

16. The combination as set forth in claim 13 which includes means for introducing fluid pressure from a source thereof different from the pressurized fluid within containers received by said enclosure.

17. The combination as set forth in claim 13 wherein said enclosure defines a cavity adapted to removably receive individual cartridges of pressurized gas, means within said enclosure for removing pressurized gas from within cartridges inserted into said enclosure, and means including valve means for communicating pressurized gas from said cartridges to said device.

18. The combination as set forth in claim 17 which includes means for forming an access opening in the cartridges of pressurized gas and communicating said gas through said opening in the cartridges to said device.

19. In combination with a fluid actuated leveling strut interposed between and adapted to control the attitude between the sprung and unsprung portions of a vehicle,
    a pressure control assembly including a housing for controlling the pressure of actuating fluid supplied to said device,
    said assembly including valve means located within said housing for maintaining a preselected minimum pressure in said device,
    said valve means normally maintained in a position providing a flow path to said strut and being movable to a position closing said flow path when the fluid pressure in said strut reaches a predetermined minimum value, an enclosure for removably receiving portable disposable containers of a pressurized fluid, and means for communicating fluid from containers received by said assembly to said strut.

20. The combination as set forth in claim 19 which includes means for communicating a source of pressurized fluid different from said containers to said strut.

21. The combination as set forth in claim 19 wherein said strut is gas operated and said enclosure is adapted to removably receive portable disposable cartridges of pressurized gas.

22. The combination as set forth in claim 21 wherein said enclosure defines a cavity adapted to removably receive individual cartridges of pressurized gas, means adjacent said cavity for removing pressurized gas from within cartridges inserted into said enclosure, and valve means for communicating pressurized gas from said cartridges from said device.

23. The combination as set forth in claim 22 wherein said enclosure is rotatable to effect movement of a cartridge in said cavity toward a means for puncturing cartridges, and which includes means for communicating gas through a punctured opening in the cartridges to said device.

24. The combination as set forth in claim 23 wherein said valve means includes a valve seat and a valve pin formed with an outwardly projecting shoulder, and which includes spring means engageable with said shoulder and normally biasing said shoulder toward a position engaging said valve member with said valve seat.

25. In combination with an automotive vehicle including luggage, passenger, and engine compartments, a sprung portion and an unsprung portion, and a pair of gas operated elevating struts for controlling the attitude between the vehicle portions, an assembly disposed in one of said compartments for controlling the pressure of the gas supplied to said struts, conduit means for communicating gas between said assembly and said struts, said assembly comprising first valve means for selectively communicating gas from a source thereof to said conduit means, second valve means for maintaining a preselected minimum pressure in said struts, and means for removable receiving portable disposable containers of gas and for communicating the gas contained therein through said conduit means to said struts.

26. The combination as set forth in claim 25 which includes means for operatively mounting said assembly within said luggage compartment.

27. The combination as set forth in claim 25 which includes a housing defining a cavity adapted to removably receive individual cartridges of pressurized gas, means adjacent said housing for removing pressurized gas from within cartridges received within said housing, and means including valve means for communicating pressurized gas from said cartridges to said devices.

28. The combination as set forth in claim 27 which includes means for puncturing cartridges of pressurized gas and communicating said gas through a punctured opening in the cartridges to said devices.

29. The combination as set forth in claim 27 wherein said housing defining said cavity is rotatable.

30. The combination as set forth in claim 29 which includes means for puncturing cartridges of pressurized gas in response to rotation of said housing.

* * * * *